United States Patent [19]
Honma et al.

[11] Patent Number: 5,665,291

[45] Date of Patent: *Sep. 9, 1997

[54] METHOD FOR PRODUCING HIGH DENSITY SINTERED SILICON NITRIDE($Si_3N_4$)

[75] Inventors: Katuhiko Honma, Akashi; Tsuneo Tatsuno, Kobe; Hiroshi Okada, Amagasaki; Masato Moritoki, Miki; Takao Fujikawa, Kobe, all of Japan

[73] Assignee: Kabushiki Kaisha Kobe Seiko Sho, Kobe, Japan

[*] Notice: The term of this patent shall not extend beyond the expiration date of Pat. No. 5,445,776.

[21] Appl. No.: 463,273

[22] Filed: Jun. 5, 1995

Related U.S. Application Data

[63] Continuation of Ser. No. 251,052, Sep. 26, 1988, Pat. No. 5,603,876, which is a continuation of Ser. No. 312,727, Oct. 19, 1981, abandoned.

[30] Foreign Application Priority Data

| Oct. 20, 1980 | [JP] | Japan | 55-146581 |
| Dec. 2, 1980 | [JP] | Japan | 55-170155 |
| Jan. 27, 1981 | [JP] | Japan | 56-11180 |
| Jun. 17, 1981 | [JP] | Japan | 56-94385 |

[51] Int. Cl.⁶ .................................................. C04B 35/584
[52] U.S. Cl. ................... 264/666; 264/85; 264/570; 264/325; 264/683
[58] Field of Search ................ 264/65, 85, 325, 264/62, 570

[56] References Cited

U.S. PATENT DOCUMENTS

| 4,112,143 | 9/1978 | Adlerborn | 264/570 |
| 4,196,178 | 4/1980 | Iwai et al. | 264/344 |
| 4,264,548 | 4/1981 | Ezis | 264/65 |
| 4,296,065 | 10/1981 | Ishii et al. | 264/325 |
| 5,445,776 | 8/1995 | Honma et al. | 264/65 |

FOREIGN PATENT DOCUMENTS

| 2031466 | 4/1980 | United Kingdom | 501/97 |

OTHER PUBLICATIONS

Abstract of German Patent 2621523.
Kobe Steel, Ltd., No. 313011, Hot and Cold Isostatic Pressing Equipment, pp. 1–10.
Kobe Steel, Ltd., No. 428090, Hot Isostatic Press, pp. 1–6.

*Primary Examiner*—James Derrington
*Attorney, Agent, or Firm*—Oblon, Spivak, McClelland, Maier & Neustadt, P.C.

[57] ABSTRACT

The specification describes a method for producing high density sintered silicon nitride ($Si_3N_4$) having a relative density of at least 98%. In a first step, silicon nitride powder is compacted into a desired shape. It is then pre-sintered in a second step, generally, under normal pressure to obtain a presintered body having a relative density of at least 92%. In a third step, the presintered body is subjected to a hot isostatic pressing (HIP) in an inert gas atmosphere of 1500°–2100° C. and of nitrogen gas partial pressure of at least 500 atm. Since the presintering does not require any capsule, it is possible to produce high density sintered $Si_3N_4$ of complex configurations. As a sintering aid, $Y_2O_3$—$Al_2O_3$—MgO system sintering aid is particularly effective. To improve the strength of sintered $Si_3N_4$, it is effective to add a heat treatment step after the HIP and maintain the temperature of the sintered $Si_3N_4$ above 500° C. for a while. Between the second and third steps, the temperature of the presintered body is preferably maintained above 500° C. These temperature controls are effective not only to improve the strength of sintered $Si_3N_4$ but also to save the thermal energy and to shorten the production cycle.

20 Claims, 5 Drawing Sheets

METHOD FOR PRODUCING HIGH DENSITY SINTERED SILICON NITRIDE($Si_3N_4$)

This is a continuation of application Ser. No. 07/251,052 filed on Sep. 26, 1988 now U.S. Pat. No. 5,603,876, which is a continuation of application Ser. No. 06/312,727 filed on Oct. 19, 1981 now abandoned.

BACKGROUND OF THE INVENTION

2. Field of the Invention

This invention relates to a method for producing high density sintered silicon nitride ($Si_3N_4$) having a density equivalent to or higher than that of a conventional hot pressed body, which method facilitates the production of sintered bodies of complex configurations. More particularly, it relates to a method of further desifying and strengthening a presintered silicon nitride body, which has in advance been formed and presintered into a desired shape by the pressureless sintering method or the like, in accordance with the hot isostatic pressing method (hereinafter referred to as "HIP method").

2. Description of the Prior Art

With a view toward improving the thermal efficiency, saving fuel, reducing pollution and lightening the weight of varied power generating equipment, active research and development work has been carried out in recent years in the field of equipments which are operated at high temperatures led by high temperature gas turbines and followed by diesel engines and MHD generators. Development of such equipments is absolutely dependent on the development of high-temperature structural materials. Thus, the development of such materials has been anxiously waited for. Under such high temperatures, conventional heat resistant metallic materials do not always exhibit sufficient mechanical strength. Also, from the view-point of saving exiguous natural resourses required for the production of such heat resistant metallic materials, intensive researches are now under way to develop high-temperature structural ceramics using as raw materials Si, Al, C, N and the like elements which are relatively abundant on the earth.

The development of such high-temperature structural materials has been recognized to be also important for the purpose of their applications in super hard tools and as corrosion resistant materials, and is attracting great interests thereon.

Among such high-temperature structural ceramics, silicon nitride ($Si_3N_4$) is attracting researchers interests as one of most promising materials for providing sufficient strength, chemical stability and strong resistance to thermal shocks at high temperatures.

$Si_3N_4$ pertains excellent physical properties as described above. These properties stem from the fact that silicon atoms (Si) and nitrogen atoms (N) are united by firm covalent bonds in silicon nitride ($Si_3N_4$). However, this nature of $Si_3N_4$ means, on the other hand, that it is hard to be sintered and extremely difficult to be formed into a product of complex configurations. As a matter of fact, most of recent researches in this field are directed how to produce formed $Si_3N_4$ bodies having high strength. However, in view of the present state of the art, it does not appear that a fully satisfactory technique has been developed for the production of such $Si_3N_4$ bodies.

More specifically, where high density and high strength are pursued, the shape of a formed body has to be unavoidably limited to simple one. On the other hand, to obtain a formed body of complex configurations, its strength has to be sacrificed to a considerable extent.

Among well-known conventional production methods of formed $Si_3N_4$ bodies, there are following four methods: (i) the chemical vapor deposition method (hereinafter referred to as the CVD method); (ii) a method in which $Si_3N_4$ powder is mixed with a sintering aid and then sintered in an $N_2$ atmosphere of atmospheric pressure or 10 atom or so; (iii) the hot pressing method; and (iv) reaction bonding method. Of the above methods, the hot pressing method (iii) can provide formed bodies of a relatively high density and strength but is still accompanied by problems that formed bodies of a complex shape are difficult to obtain and it is costly to practise.

On the other hand, the reaction bonding method has a merit that complex configurations can easily be formed by a suitable conventional method owing to the use of Si powder as a raw material. However, it is accompanied by drawbacks that resultant sintered bodies do not have a high density and high strength sintered $Si_3N_4$ cannot be obtained. The densities of sintered $Si_3N_4$ bodies currently produced in accordance with the reaction bonding method are merely somewhat greater than 80%. This insufficient density impedes to improve the strength of sintered bodies. Moreover, an extremely long time period is required for the nitridation. For example, the reaction treatment requires at least two days in shorter cases and, in some longer cases, takes as long as 10 days or more. This is certainly a great problem in adopting the reaction bonding method.

The pressureless sintering method is a method to sinter a silicon nitride green compact which has in advance been formed into a desired shape. Thus, this method is rather easy to produce sintered products of complex configurations. However, the densities of such products are limited and are around 96% even for higher ones.

As an improved method over the above-described, pressureless sintering method, there has been proposed to sinter a green compact, which has been preformed into a desired shape, in an $N_2$ gas atmosphere of several atm to several ten atm as described in Japanese Patent Laid-open No. 47015/1972 laid-open Apr. 14, 1972 and naming as an inventor Mamoru Mitomo as well as Japanese Patent Laid-open No. 102320/1928 laid-open Sep. 6, 1978 and naming as an applicant General Bleatrio Company. Such an improved method can provide sintered bodies having a density as high as 98% at maximum. However, it still fails to meet both of the requirements, namely, requirements for the formation of complicated shapes and the high densification. Especially, as a serious obstacle to the high densification, there is mentioned the thermal decomposition problem of $Si_3N_4$ upon sintering. Namely, upon sintering $Si_3N_4$, MgO, $SiO_2$, $Al_2O_3$ and/or the like are incorporated as a sintering aid. These compounds are however believed to volatilize during the sintering step by their reaction with $Si_3N_4$ as described below.

On the other hand, $Si_3N_4$ per se is known to undergo a thermal decomposition as described below.

Due to these thermal decomposition reactions, a weight loss normally takes place during a sintering step and, in some instance, such a weight loss exceeds the rate of density increase due to the shrinkage of a sintered body upon sintering. It has been reported that such a weight reduction may, in some instances, reach as high as 50%. The above-described sintering method in an $N_2$ gas atmosphere was proposed as a measure for inhibiting the thermal decomposition but is still believed to cause a weight loss of several percents.

According to a research carried out by the present inventors, it has been recognized that the weight loss caused by the thermal decomposition has a close relationship with the density of a green compact before sintering as will be described later. The present inventors have also found that the weight loss due to thermal decomposition tends to become considerable where the initial density (i.e., the density of a green compact before sintering) is low but it becomes smaller as the initial density increases. From this finding, the decomposition reaction is considered to proceed, in the conventional sintering method in an $N_2$ gas atmosphere, to the interior of a sintered body since the density of a green compact before sintering is merely 60% or so and its pores are completely open, and reaction products of the thermal decomposition are thus allowed to diffuse from the interior of the sintered body to the exterior of the same.

It is certainly an effective measure to increase the nitrogen gas partial pressure to suppress the aforementioned thermal decomposition in the sintering method in an $N_2$ gas atmosphere. However, an $N_2$ gas partial pressure of several ten atm or so, which has been employed in the conventional method, is by no means sufficient to effectively prohibit the thermal decomposition from the thermodynamical viewpoint.

As a method for highly densifying $Si_3N_4$, it has been known to employ an HIP treatment using Ar gas. To follow this method, $Si_3N_4$ powder is generally sealed hermetically in a capsule made of a gas-impermeable material such as glass and then subjected to an HIP treatment. This method is however impractical to produce a sintered body of a complex shape as it is extremely difficult to shape a capsule corresponding with the configurations of the intended product. It is also impractical as it still involves many problems to be solved, such as filling uniformly $Si_3N_4$ powder in capsules, measures to avoid the reaction between $Si_3N_4$ and capsules, and measures to decapsulate resultant $Si_3N_4$ bodies from the capsules. In addition, it has also been proposed to close the pores of a green compact to a certain extent prior to applying an HIP treatment by subjecting the green compact to a presintering treatment. It is however difficult, generally speaking, to achieve a high density by this method as a considerable weight loss takes place due to the thermal decomposition of $Si_3N_4$.

On the other hand, a lot of investment has been poured to find out a sintering aid suitable for producing high density sintered $Si_3N_4$. However, under the present circumstances, it is still far away from the goal. It is considered to be promising to employ $Y_2O_3$ or a mixture of $Y_2O_3$ and $Al_2O_3$ as a sintering aid for $Si_3N_4$. As a matter of fact, it has been known that a sintered body having excellent mechanical properties can be obtained by mixing a suitable amount of such a sintering aid and $Si_3N_4$ powder and by sintering the resultant mixture in accordance with the hot pressing method. However, such $Y_2O_3$ system sintering aids are accompanied by a drawback that the pressureless sintering method, which is rather easy to produce bodies of complex configurations, cannot be applied to obtain sintered bodies of high density and strength. Thus, such $Y_2O_3$ system sintering aids are employed exclusively for the production of bodies of simple configurations in accordance with the hot pressing method.

As a result of an extensive research conducted by the present inventors, it has been unexpectedly found that high density sintered silicon nitride ($Si_3N_4$) of a relative density of 98% or higher may be obtained by compacting silicon nitride powder into a green compact having a desired shape, presintering the green compact to a relative density of at least 92%, and then subjecting said presintered body to a hot isostatic pressing in an inert gas atmosphere of a temperature in the range of 1500°–2100° C. and of a nitrogen gas partial pressure of at least 500 atm until the former relative density is reached. In this invention the gas used in the hot isostatic pressing is only the nitrogen or a gas mixture including the nitrogen. This method may be similar to the aforementioned prior art methods in an incorporation of the HIP method. However, the above finding of the present inventors is fundamentally different from the conventional HIP method as, in the former case, the relative density of a presintered body is raised to 92% or higher and it is then subjected to an HIP treatment in an inert atmosphere of the above specific temperature and $N_2$ gas partial pressure.

The present inventors have also found that an incorporation of a $Y_2O_3$—$Al_2O_3$—MgO system mixture as a sintering aid in $Si_3N_4$ powder can provide under normal pressure a presintered body of a higher density compared with the addition of a conventional $Y_2O_3$ or $Y_2O_3$—$Al_2O_3$ system sintering aid.

As a result of an experiment carried out by the present inventors to determine whether there is any relationship between the relative density of sintered $Si_3N_4$ and its strength, it has been found that they are not always corelated to each other. The inventors expanded the study and carried out a further experiment while paying attention to $\beta$—$Si_3N_4$ in presintered bodies. As a result of the further experiment, it has been found that the strength of a sintered $Si_3N_4$ body corelates to the content of $\beta$—$Si_3N_4$ in the presintered $Si_3N_4$.

Furthermore, it has been realized that the present sintering method, which makes use of an HIP treatment, involves the following problem in order to more effectively apply the same to the industry. Namely, a presintered body is discharged from a presintering furnace upon completion of the presintering step and cooled prior to charging the same into an HIP furnace. The thus-presintered body is then charged at a cooled temperature into the HIP furnace, although the HIP treatment requires 1000° C. or higher, particularly, a high temperature of at least 1500° C. for $Si_3N_4$.

Such a cooling of a presintered body maybe unavoidable where the sintering method is performed batch by batch. This however leads undoubtedly to a considerable loss of heat energy in view of the fact that the presintered body has been heated to a considerable extent during its presintering step. In addition, when a presintered body which has been presintered at high temperatures is rapidly cooled at the surface thereof or after the rapid cooling when rapidly heated extremely fine cracks and fissures are susceptible of occurring, whereby unavoidably deteriorating its strength and causing other problems with respect to its quality.

The present inventors have also found a measure capable of effectively overcoming the above problems of the thermal energy loss and strength deterioration caused by the rapid cooling of presintered and sintered bodies. Namely, it has been uncovered that the thermal energy loss may be reduced and a high density sintered $Si_3N_4$ body can be obtained by charging a presintered body, while maintaining its temperature above 500° C., into an HIP furnace which has been in advance heated at 500° C. or higher to conduct the HIP treatment, discharging the thus-sintered $Si_3N_4$ body from the HIP furnace at a temperature of at least 500° C., and then subjecting the same to a heat treatment at 500° C. or higher in a heat treatment furnace.

SUMMARY OF THE INVENTION

According to one aspect of this invention, there is provided a method for producing high density sintered silicon nitride ($Si_3N_4$) having a relative density of at least 98%. The method comprises forming silicon nitride powder into a desired shape to obtain a silicon nitride green compact, presintering said green compact to a presintered body having a relative density of at least 92%, and then subjecting said presintered body to a hot isostatic pressing in an inert gas atmosphere of a temperature in the range of 1500°–2100° C. and of a nitrogen gas partial pressure of at least 500 atm until the former relative density is reached.

In another aspect of this invention, the silicon nitride powder may contain a sintering aid, for example, 3–13% by weight of $Y_2O_3$, 0.5–4% by weight of $Al_2O_3$ and 0.5–6% by weight of MgO.

In a further aspect of this invention, the presintered body contains 20–80% by weight of $\beta$—$Si_3N_4$ and the content of $\beta$—$Si_3N_4$ in the sintered silicon nitride ($Si_3N_4$) is increased to 80% or higher through the hot isostatic pressing.

In a still further aspect of this invention, the presintered body is discharged at a temperature of at least 500° C. from a presintering furnace and immediately charged at a temperature of 500° C. or higher into a hot isostatic pressing furnace which has been preheated to 500° C. or higher in advance; upon completion of the hot isostatic pressing, the sintered body is discharged at a temperature of at least 500° C. from the hot isostatic pressing furnace and then charged at a temperature of 500° C. or higher into a heat treatment furnace, which has been maintained at 500° C. or higher, to conduct a heat treatment in a non-oxidizing gas atmosphere.

BRIEF DESCRIPTION OF THE DRAWINGS

The invention will now be described by way of example with reference to the accompanying drawings in which.

DETAILED DESCRIPTION OF THE PREFERRED EMBODIMENTS OF THE INVENTION

First of all, the raw material $Si_3N_4$ employed in the method of this invention may be obtained through the nitridation of metallic Si or may be prepared from $SiO_2$ by its reduction or from $SiCl_4$ or $Si(NH)_2$ in accordance with the gas phase reaction method or thermal decomposition method. In view of the bend strength of sintered $Si_3N_4$ to be obtained, it is preferable to employ that prepared in accordance with the gas phase reaction method or the thermal decomposition method. In addition, the ratio of both amorphous forms in a raw material $Si_3N_4$ powder, in other words, the ratio of $\alpha$—$Si_3N_4$ to $\beta$—$Si_3N_4$ is desirously such that the content of $\beta$—$Si_3N_4$ in a presintered body to be obtained through its presintering would range 20–80% by weight as will be described later in this specification. It is particularly preferred that the raw material $Si_3N_4$ contains $\alpha$—$Si_3N_4$ in a proportion of at least 80% by weight.

As a sintering aid which may be incorporated in the aforementioned $Si_3N_4$ powder, there may be mentioned the oxide or nitride of Y, Al, Mg, Ti or the like, or $ZrO_2$, BeO, $La_2O_3$, $CeO_2$ or the like. Such compounds may be used solely or in combination. A sintering aid consisting of a $Y_2O_3$—$Al_2O_3$—MgO system mixture is most effective. Such a sintering aid may be incorporated in the powder up to 30% by total weight. It is however particularly preferable to add $Y_2O_3$, $Al_2O_3$ and MgO respectively in amounts of 3–13%, 0.5–4% and 0.5–6%, all by weight. The forming of $Si_3N_4$ powder containing such a sintering aid may be effected, depending on the shape to be formed, by injection molding, extrusion, die pressing or isostatic pressing method.

Figure 1:
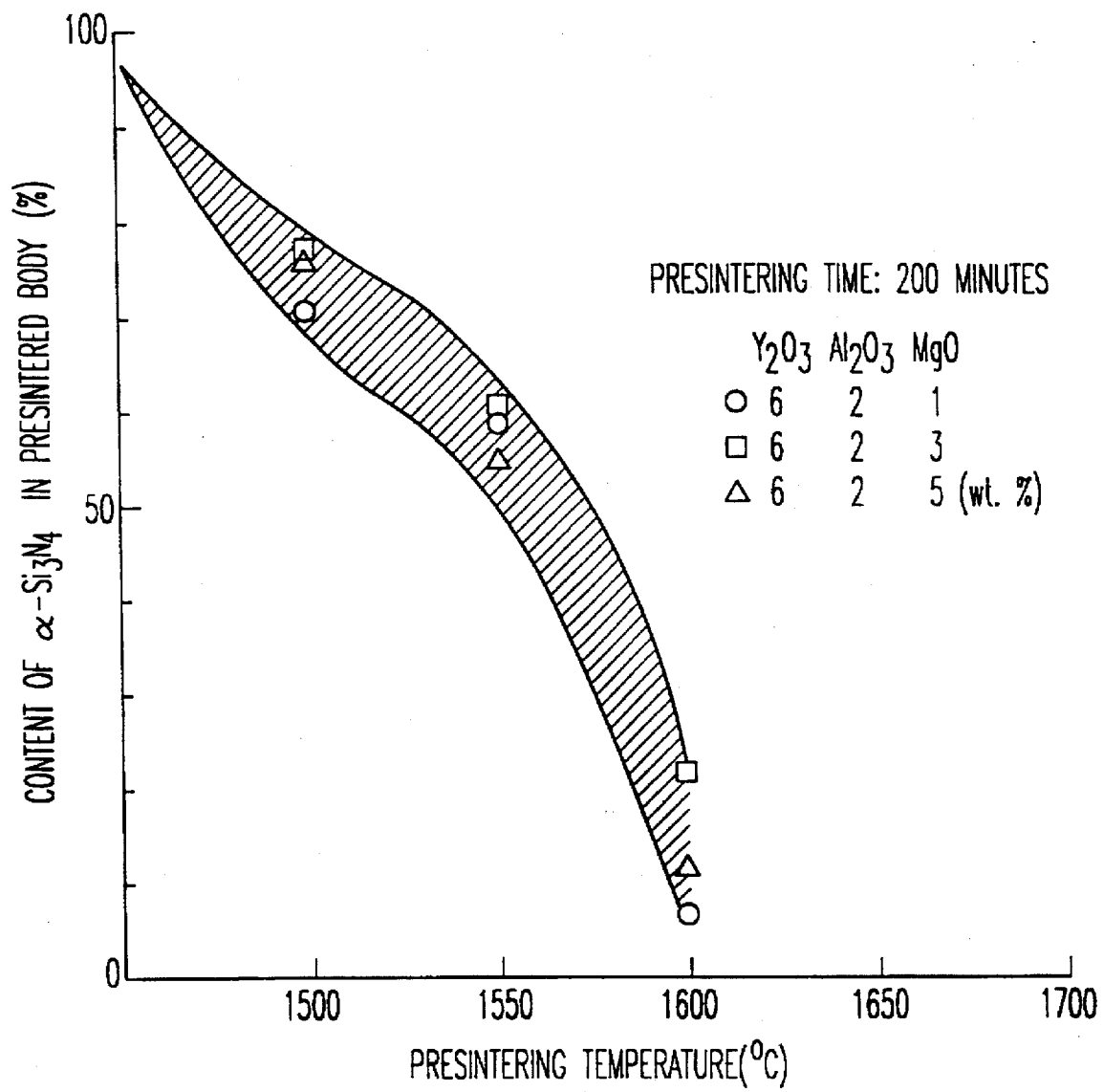
FIG. 1 is a diagrammatic illustration of an example of the relationship between presintering temperature and the content of $\alpha$—$Si_3N_4$ in resultant presintered body.

The green compact formed into a predetermined shape as mentioned above is then presintered to obtain a presintered $Si_3N_4$ body whose relative density is 92% or higher and, preferably, which contains 20–80% by weight of $\beta$—$Si_3N_4$. The presintering may be carried out in accordance with the conventionally well-known hot pressing method or a sintering method under atmospheric pressure or so or in an atmosphere of high pressure $N_2$ gas. It is however preferable to presinter in a non-oxidizing atmosphere such as $N_2$ gas or the like. The presintering temperature may vary depending on the type of sintering aid to be employed, its content and sintering time but a temperature range of 1400°–1800° C. is generally suitable. FIG. 1 is a diagrammatic illustration of an example of the relationship between presintering temperature and the content of $\alpha$—$Si_3N_4$ in resultant presintered body. It shows the relationship between presintering temperatures and the contents of $\alpha$—$Si_3N_4$ in the corresponding presintered bodies when $Si_3N_4$ powder was added with 6% by weight of $Y_2O_3$ and 2% by weight of $Al_2O_3$ as well as, respectively, 1%, 3% and 5% by weight of MgO as a sintering aid and then presintered for 200 minutes by varying the presintering temperature. As apparent from FIG. 1, the content of $\alpha$—$Si_3N_4$ in the presintered body varies in accordance with the amount of the sintering aid to be incorporated. The content of $\alpha$—$Si_3N_4$ ranges about 80%–20% by weight for a presintering temperature range of 1500°–1600° C. Therefore, to limit the content of $\beta$—$Si_3N_4$ in a presintered body within a range of 20%–80% by weight, it is preferable to employ as the presintering temperature a lower temperature range of 1500°–1600° C.

On the other hand, the presintering time may also change depending on the type and content of sintering aid to be used as well as presintering temperature. A period of 50–200 minutes is generally suitable.

Figure 2:
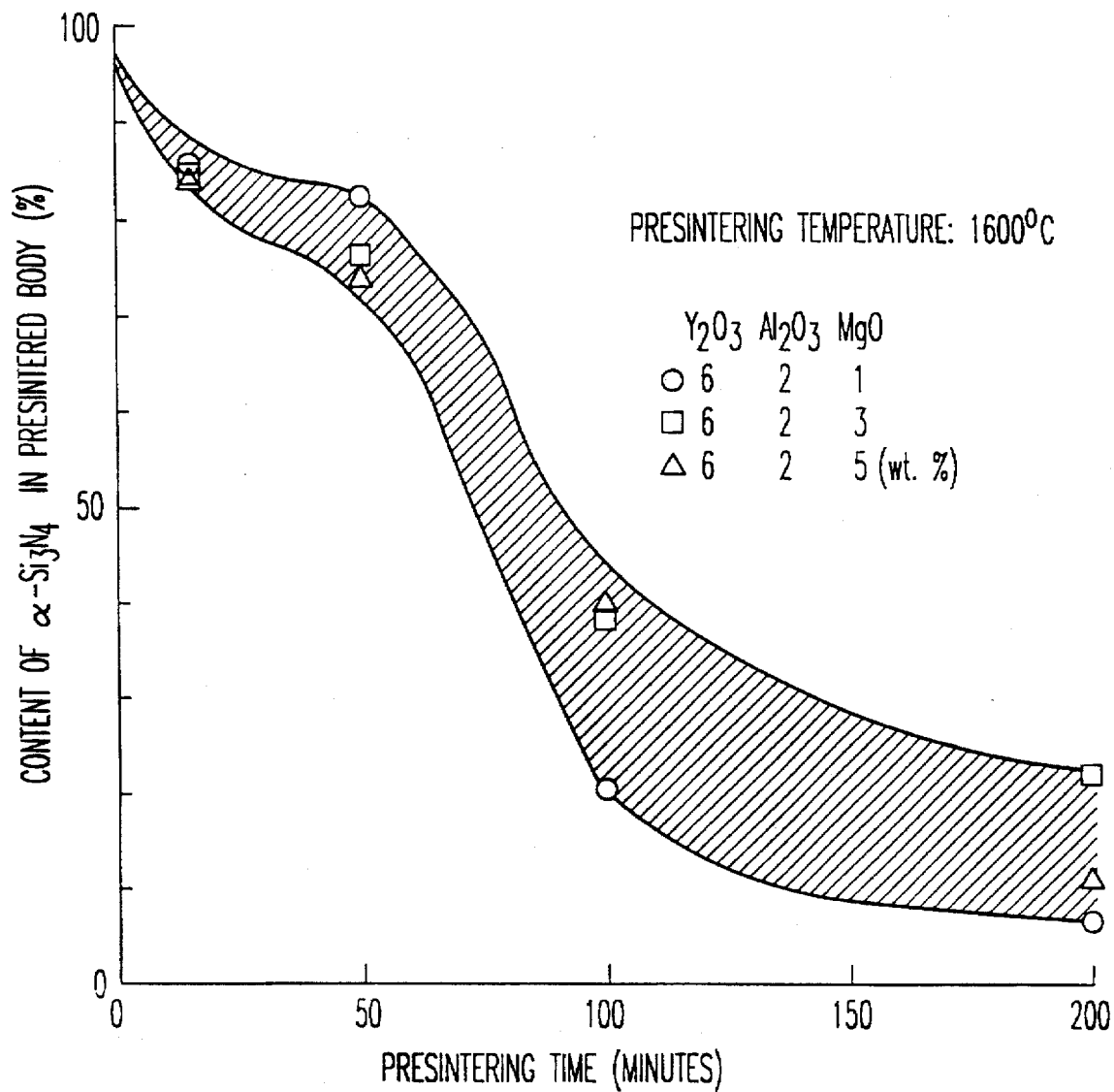
FIG. 2 is a graphical representation of the content of $\alpha$—$Si_3N_4$ in presintered $Si_3N_4$ body at various sintering time periods.

FIG. 2 illustrates an example of the relationship between presintering time and the content of $\alpha$—$Si_3N_4$ in a presintered body. It illustrates the relationship between presintering time periods and the contents of $\alpha$—$Si_3N_4$ in resultant presintered bodies when $Si_3N_4$ powder was added with 6% by weight of $Y_2O_3$ and 2% by weight of $Al_2O_3$ as well as, respectively, 1%, 3% and 5% by weight of MgO as a sintering aid and then presintered at 1600° C. by changing the presintering time. As readily envisaged from FIG. 2, the content of $\alpha$—$Si_3N_4$ in a presintered body varies depending on the amount of the sintering aid to be added. For a sintering time period of 50–200 minutes, the content of $\alpha$—$Si_3N_4$ in a presintered body ranges approximately 80%–20%. Thus, to limit the content of $\beta$—$Si_3N_4$ in a presintered body within 20%–80%, it is easily gathered that the sintering time should preferably be from 50 minutes to 200 minutes.

It is important to obtain through the presintering treatment a presintered body whose bend strength can be increased in an HIP treatment, which will be described later. It is desirous that a presintered body contains $\beta$—$Si_3N_4$ in an amount of 20%–80% by weight. Although reasons for the importance of $\beta$—$Si_3N_4$ content in a presintered body have not yet been known, it appears that the presence of $\beta$—$Si_3N_4$ in a proportion of 80% or less, in other words, the presence of $\alpha$—$Si_3N_4$ in an amount of 20% or more is effective to prevent $\beta$-type crystals from coarsening during their formation or growth through an HIP treatment in view of the fact that an observation of fracture surfaces of a sintered $Si_3N_4$ body obtained by an HIP treatment, said fracture surface having been formed through its bend strength test, indicated coarsened needle-like crystals where the content of $\beta$—$Si_3N_4$ in a presintered body exceeds 80%.

The thus-obtained presintered body is then subjected to an HIP treatment to prepare a high density sintered $Si_3N_4$ whose relative density is at least 98%, and preferably, whose $\beta$—$Si_3N_4$ content is 80% by weight or more, more preferably, 90% or higher. Here, although the relative density of a presintered body is defined to be at least 80%, some presintered bodies whose relative densities are rather close to the lower limit may still contain open pores, in other words, pores extending from the interior to the surface and opening into the exterior. If such presintered bodies are subjected to an HIP treatment as they are, the HIP treatment can eliminate closed pores but open pores would still remain. Thus, it is rather difficult to obtain a sintered body whose relative density is 98% or higher. It is thus preferred to apply a pore-closing treatment to presintered bodies whose relative densities are low by coating thereon the oxide or nitride of Si, Al, or the like prior to subjecting them to an HIP treatment. According to a study of the present inventors, pores in a presintered body do not open into its surface but substantially closed where its relative density is 92% or higher. Accordingly, such a presintered body can be subjected directly to an HIP treatment without need for any pore-closing treatment. Even if the relative density is 92% or higher, the presintered body may obviously be subjected to a pore-closing treatment prior to conduct an HIP treatment thereon, for example, for the purpose of avoiding the decomposition reaction of $Si_3N_4$ where Ar gas is used as a pressure medium gas.

The HIP treatment is carried out in an atmosphere of an inert gas such as Ar gas, $N_2$ gas, or the like. It is however preferable to conduct the HIP treatment in an $N_2$ gas atmosphere for the reasons that $N_2$ gas can prevent the decomposition reaction of $Si_3N_4$ and thus highly densify the same.

For HIP treatment, a temperature range of 1500°–2100° C., more preferably, 1700°–2000° C. may be employed. The HIP temperature is desirously higher than that employed in the presintering step. Needless to say, the HIP temperature must be lower than the decomposition temperature of $Si_3N_4$. Although the decomposition temperature increases as the HIP pressure goes higher, it is preferable to carry out an HIP treatment at a temperature lower by at least 100° C. than the decomposition temperature of $Si_3N_4$ at the pressure of the HIP treatment. If the HIP temperature is below 1500° C., the strength of a sintered body can be improved only by 20–30% in comparison with the strength of the presintered body before the HIP treatment although the presintered body can be densified to its theoretical density or so. On the other hand, above 1500° C., $Si_3N_4$ undergoes not only densification but also considerable $\beta$-transformation, whereby remarkably improving its strength. Furthermore, an HIP treatment at higher temperatures causes the coarsening of grains. An abrupt strength reduction takes place above 2100° C. As the HIP temperature becomes higher, the HIP apparatus has to be made greater and its thermocouples are deteriorated to a greater extent. Thus, a suitable HIP temperature range is, as described above, 1500°–2100° C.

Next, the HIP pressure is preferably 500 atm or higher. Below 500 atm, the HIP treatment requires long time. Furthermore, the extent of the decomposition reaction of $Si_3N_4$ would become greater in proportion with the HIP time, thereby leading to a weight reduction and making it difficult to achieve the high densification. Therefore, it is desirous to set the HIP pressure at at least 500 atm, preferably, above 700 atm. Where $N_2$ gas is employed as a constituent of the atmosphere for HIP treatment, the $N_2$ partial pressure is preferably at least 500 atm.

As the HIP pressure increases, the decomposition reaction of $Si_3N_4$ would be more effectively suppressed and it would become easier to attain the high densification. However, excessively high pressures are impractical for HIP treatment as more time is required to reach such high pressures and larger HIP treatment system is also required, led by the compressor for raising the pressure and including the main casing, i.e., pressure vessel. Thus, from the practical point of view, it is desirous to carry out the HIP treatment at pressures up to 2500 atm.

On the other hand, the HIP treatment time may preferably range from 1 minutes to 3 hours and is generally about 30 minutes or so.

It is possible to crystallize partially or completely the glassy phases at grain boundaries of $Si_3N_4$ in the course of the HIP treatment, thereby improving its strength further.

As has been described above, a presintered $Si_3N_4$ body can be converted to a high density sintered $Si_3N_4$ body having a relative density of at least 98% through an HIP treatment.

When an HIP treatment is applied while burying a presintered body in powder consisting principally of at least one nitride ceramics selected from silicon nitride, aluminum nitride and boron nitride, the decomposition reaction of the presintered body can be suppressed and a highly strong and dense sintered silicon nitride can be provided.

Where the content of $\beta$—$Si_3N_4$ in a presintered body is controlled within a range of 20–80%, its sintering can be performed easily through an HIP treatment, thereby achieving easily high densification. At the same time, in the thus-obtained sintered $Si_3N_4$ body, most $Si_3N_4$ have been transformed into $\beta$—$Si_3N_4$ and its structure is very fine, thus producing high density sintered $Si_3N_4$ with an improved bend strength.

Furthermore, the HIP treatment not only facilitates high densification but also enables a high temperature treatment of $Si_3N_4$. Thus, it is possible to shorten the time required to transform from $\alpha$—$Si_3N_4$ to $\beta$—$Si_3N_4$, leading to a cutdown of its production cost. Where a mixture of $Si_3N_4$ powder and a sintering aid is compacted and presintered, the forming is rather easy even if it has a complex shape. As mentioned above, the HIP treatment enables to achieve high densification and improved strength. Therefore, the present invention has an advantage that sintered $Si_3N_4$ of a desired complex shape and having high density and strength can be produced easily. Consequently, the method of this invention is extremely practical as an industrial production method of sintered $Si_3N_4$ bodies.

Now, a sintering method according to another embodiment of this invention, which method is capable of reducing the thermal energy loss and minimizing the deterioration in strength due to rapid temperature changes, is sequentially described in the order of its steps. This sintering method is carried out in three steps, namely, presintering step, HIP treatment step, and heat treatment, step. Of the three steps, the presintering and HIP treatment steps are carried out as described before.

As mentioned above, where a presintered body has a relative density of 92% or higher, its surface is substantially free of pores and pores in the body do not extend to the surface. Thus, a high densification is easily feasible by the above-described HIP treatment. Taking the bend strength of sintered $Si_3N_4$ into consideration, it is suitable to make the content of $\alpha$—$Si_3N_4$ in the raw material powder be at least 80%.

The thus-presintered $Si_3N_4$ has now gotten through the first step and is then charged, without allowing its temperature to cool down to room temperature and while maintaining a temperature of 500° C. or higher, into an HIP furnace for subjecting the same to an HIP treatment.

For carrying out the HIP treatment at high temperatures and pressures, the HIP is usually preheated to a high temperature of 500° C. or higher and maintained at that temperature. Thus, it is possible to design the production facilities so as to charge the presintered $Si_3N_4$ continuously into the HIP furnace.

By charging the presintered $Si_3N_4$ into the HIP furnace without once lowering its temperature and conducting the HIP treatment, it is possible to save thermal energy which is required to raise the temperature of the presintered $Si_3N_4$ in the above-mentioned sintering method making use of an HIP treatment, as the presintered $Si_3N_4$ is once withdrawn from a presintering furnace, allowed to cool down, and then charged into the HIP furnace in the ordinary two-step sintering method which combines a presintering step with an HIP treatment. It is also possible to shorten the HIP treatment cycle. Furthermore, it brings about another advantage that the occurrence of cracks due to rapid cooling upon withdrawal of the presintered $Si_3N_4$ and rapid heating upon charging into the HIP furnace can be effectively prevented.

The HIP treatment can be carried out directly on a presintered body in a known HIP furnace without need for any capsule. It is however necessary to conduct the HIP treatment in an $N_2$ gas atmosphere as mentioned above so as to prevent the decomposition reaction of $Si_3N_4$ and achieve a high densification.

A sintered body, which has been densified through the above HIP treatment, is then discharged at a temperature of at least 500° C. from the HIP furnace and then subjected to a heat treatment in a non-oxidizing gas atmosphere by charging the same into a heat treatment furnace maintained at 500° C. or higher.

Conventionally, a sintered body, which has been subjected to an HIP treatment, was cooled to room temperature after the HIP treatment to obtain a final product. It is possible to enhance the strength of a sintered $Si_3N_4$ body and to improve its quality further by employing the heat treatment. It is important to conduct this heat treatment in a non-oxidizing atmosphere such as $N_2$ gas or the like to avoid the thermal decomposition of $Si_3N_4$.

The heat treatment temperature varies, similar to the HIP treatment temperature, depending on the type and content of the sintering aid as well as HIP conditions. A temperature of 500° C. or higher is considered to be effective for increasing the strength of a sintered body. The heat treatment does not require too long time but 5–10 minutes are sufficient.

Sintered $Si_3N_4$ is produced through the first, second and third steps as described above. Since the resultant sintered body is not subjected to rapid cooling or heating in the course of its production, the occurrence of cracks is prevented, thereby resulting in excellent quality having high strength and density. In addition, the strength of sintered $Si_3N_4$ can be enhanced further by crystallization of glassy phases at grain boundaries therein through the heat treatment. Moreover, also upon conducting this heat treatment, the sintered body is discharged at 500° C. or higher after the HIP treatment and then charged into the heat treatment furnace which is also maintained at 500° C. or higher. Thus, it is possible to minimize the thermal energy loss which otherwise takes place in the heat treatment step.

As has been described above, $Si_3N_4$ is presintered at high temperatures, preferably, in the range of 1000°–1800° C., charged without allowing it to cool down to room temperature and while maintaining it above 500° C. into an HIP furnace also preheated to 500° C. or higher to perform a densification treatment through the HIP treatment, and then charging the sintered body after the HIP treatment, while maintaining it above 500° C., into a subsequent heat treatment furnace which has beforehand been maintained above 500° C. This can prohibit the occurrence of cracks due to thermal shocks during rapid cooling or heating, thereby easily providing sintered $Si_3N_4$ of high strength and density. By strictly controlling the treatment temperatures throughout the presintering, HIP treatment and heat treatment steps, it is possible to realize the desire for the continuation of these steps and reduce the loss of thermal energy to be consumed. Thus, the above sintering method is in conformity with the trend of energy saving which is of a primary concern these days and realizes to shorten the production cycle and to improve the efficiency of production. Therefore, this sintering method is expected to enjoy its commercial utility as an economical and practical production process.

The invention will hereinafter be described in further detail in accordance with the following varied examples.

EXAMPLE 1

To commercially available $Si_3N_4$ obtained through the nitridation of Si powder, were added as a sintering aid 6% by weight of $Y_2O_3$ powder and 2% by weight of $Al_2O_3$ respectively. The resulting mixture was balled milled for 10 hours in an organic solvent and then dried to powder. Subsequent to cold compacting the powder under a pressure of 1 ton/cm$^2$, it was formed into presintered bodies having various relative densities in accordance with the sintering method in an $N_2$ gas atomosphere or the hot pressing sintering method.

Figure 3:
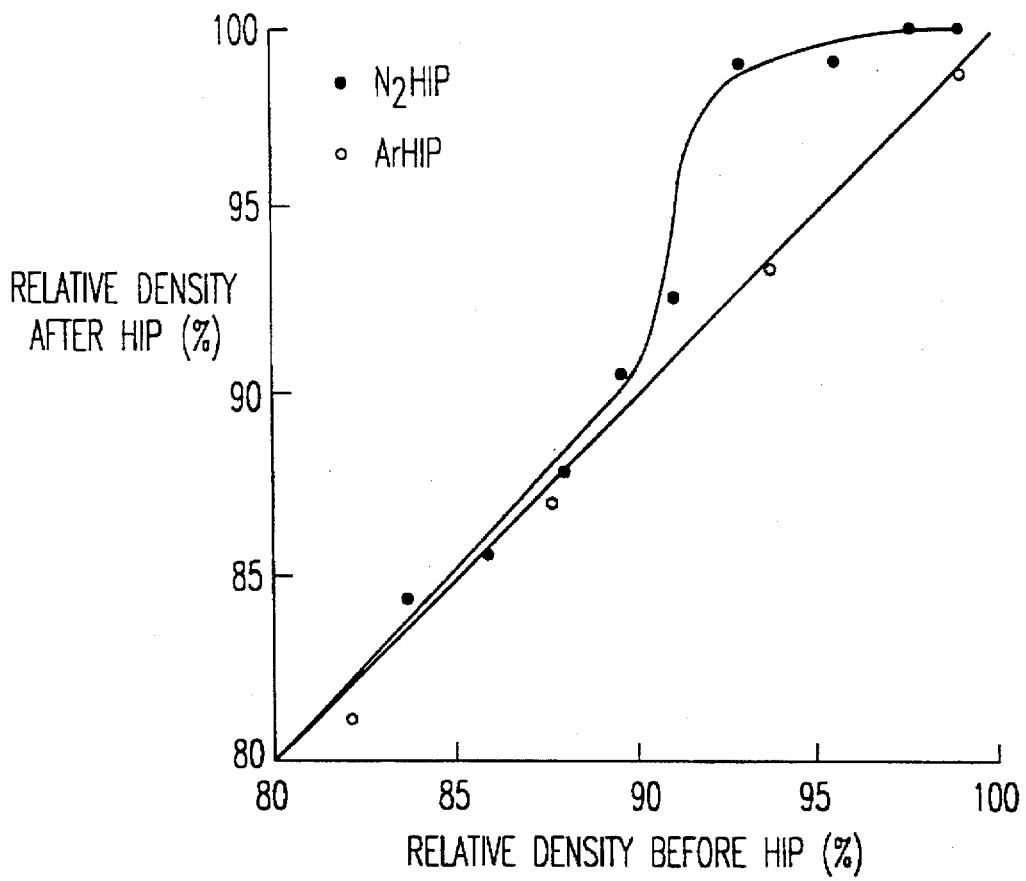
FIG. 3 is a graphical illustration showing changes in relative density of various presintered $Si_3N_4$ bodies before and after their hot isostatic pressing treatments.

The thus-obtained presintered bodies of various densities were subjected to an HIP treatment for 1 hour in an Ar gas or $N_2$ gas atmosphere of 1800° C. and 1000 atm. A measurement of density changes before and after the HIP treatment gave a result as shown in FIG. 3.

As apparent from FIG. 3, when the HIP method using $N_2$ gas (hereinafter referred to as "the $N_2$ HIP method) is compared with the HIP method employing Ar gas (hereinafter referred to as "the Ar HIP method"), it is appreciated that, in the bodies presintered by the Ar HIP method, the densities after the HIP treatment remains below their corresponding densities before the HIP treatment over the entire range of the relative densities and the weight loss due to the thermal decomposition of $Si_3N_4$ is thus greater in ratio than the densification effect owing to the HIP treatment. On the other hand, it is also envisaged from the figure that, in the bodies presintered in-accordance with the $N_2$ HIP method, no substantial differences are observed in relative density between before and after the HIP treatment in a range of the relative density before the HIP treatment of up to 90% or so. This indicates that, up to the relative density of 90% or so, more inner pores communicate to the surface and are present as open pores and thus the HIP effect can be scarcely expected. However, as soon as the relative density of a presintered body exceeds 91% or so, its density after the HIP treatment increases abruptly, and, beyond 92%, high density sintered bodies of a relative density of at least 98% can be obtained always.

From the above example, it has been proven that a high density sintered body having a relative density of at least 98% can be obtained by the $N_2$ HIP method where the density of its corresponding presintered body is 92% or so before the HIP treatment. It has also become clear that the Ar RIP method is totally hopeless in achieving such a high density.

EXAMPLE 2

Figure 4:
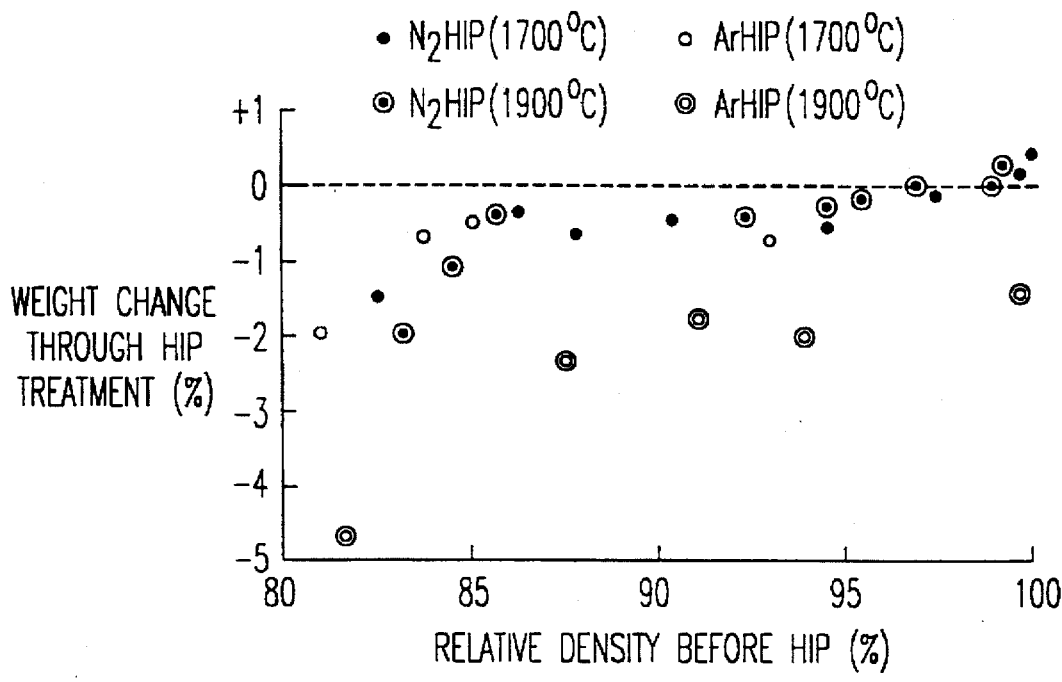
FIG. 4 shows diagrammatically the relationship between the relative densities of various presintered $Si_3N_4$ bodies and the percentage weight variations of their corresponding sintered $Si_3N_4$ bodies obtained through a hot isostatic pressing treatment.

The procedure of Example 1 was followed to obtain presintered bodies of various relative densities. They were subjected to an HIP treatment for one hour and at a temperature of 1700° C. or 1900° C. using $N_2$ gas or Ar gas. A measurement of the weight loss of each body after the HIP treatment gave a result as illustrated in FIG. 4. As appreciated from this figure, the weight loss due to the HIP treatment was small in the $N_2$ HIP treatment and was always limited below 0.5% under the HIP conditions, particularly, where the relative density was 92% or higher. Even a tendency of weight increase is observed in the higher range of the relative density before the HIP treatment. This weight gain appears to attribute to the nitridation reaction of free Si in starting powder. On the other hand, in the HIP method, as the temperature increases the decomposition reaction tends to proceed further. Thus, a considerable weight loss is observed.

In view of the above finding, it is appreciated that the $N_2$ HIP method according to this invention can render a sintered body highly dense and at the same time can improve the quality of the final product since the decomposition reaction of $Si_3N_4$, which is liable to decompose, can be minimized even in a high temperature range and, where $Si_3N_4$ powder obtained through the nitridation of Si powder is used, even a phenomenon of weight gain is observed owing to the nitridation of unreacted Si.

EXAMPLE 3

The powder obtained in Example 1 was cold compacted under a pressure of 1 ton/cm² followed by its presintering at 1900° C., in an $N_2$ gas atmosphere of 30 atm and for one hour, resulting in the preparation of a presintered body having a relative density of 95%. The thus-prepared presintered bodies are respectively subjected to the $N_2$ HIP treatment and Ar HIP treatment under HIP conditions of 1900° C.×700 atm×20 minutes. Physical properties of the presintered and sintered bodies were measured respectively before and after the HIP treatments. Results are summarized in Table 1.

TABLE 1

| | Relative density (%) | Bend strength Three-point loading test (Kg/mm²) | | Weight loss after HIP (%) |
|---|---|---|---|---|
| | | Room temp. | 1200° C. | |
| Presintered body | 95 | 71 | 38 | — |
| Ar HIP sintered body | 96 | 76 | 41 | 5.6 |
| $N_2$ HIP sintered body | 100 | 96 | 58 | 1.1 |

As apparent from the above table, the $N_2$ HIP sintered body of this invention is densified to the true density and its mechanical strength is considerably improved while suppressing the weight loss due to the HIP treatment relatively low. On the other hand, with the Ar HIP sintered body, an improvement to the density and mechanical properties cannot be expected so much and the weight loss due to the HIP treatment reached a considerably high value.

EXAMPLE 4

To commercially available $Si_3N_4$ powder obtained by nitridation of Si powder, was added 5% by weight of MgO powder as a sintering aid. The resultant mixture was ball milled in an organic solvent for 10 hours and then dried. The thus-obtained powder was then cold compacted under a pressure of 1 ton/cm². Then, the resulting green compact was presintered in accordance with the $N_2$ gas atmosphere sintering method, thereby producing a presintered body having a relative density of 93%. The thus-prepared presintered bodies were buried in various ceramics powder and subjected to the $N_2$ HIP treatment under the conditions of 1750° C.×1000 atm×0.5 hour. The density, weight change and strength of each of the resultant $N_2$ HIP sintered bodies were measured. Measurement results are given in Table 2.

TABLE 2

| Type of ceramics powder | Relative density (%) | Weight loss (%) | Bend Strength Three-point loading test (room temp. Kg/mm²) |
|---|---|---|---|
| Not used | 98 | 2 | 63 |
| 50% $Si_3N_4$ + 50% $B_4C$ | 100 | 0.3 | 75 |
| 30% $Si_3N_4$ + 70% BN | 100 | 0.5 | 72 |
| 70% BN + 30% $Al_2O_3$ | 100 | 0.2 | 78 |
| 80% AlN + 15% BN + 5% $SiO_2$ | 99 | 0.9 | 69 |

As envisaged from the above table, those subjected to an HIP treatment while being buried in ceramics powder are superior in every aspects, namely, density, strength and weight reduction to that HIP treated without being buried in any ceramics powder. This advantage appears to have derived from the fact that the ceramics powder was decomposed during the HIP treatment and increased the partial pressures of decompositon products in the circumference of the presintered body, thereby inhibiting the decomposition reaction of the presintered body as the ceramics powder-employed in the above example were each powder containing a nitride as its main component. Therefore, it is extremely effective to conduct an HIP treatment while burying a presintered body in ceramics powder as a method for suppressing the thermal decomposition of $Si_3N_4$ during the HIP treatment of a presintered $Si_3N_4$ body and obtaining sintered $Si_3N_4$ of high strength and density. Here, the ceramics powder to be employed must be powder of a nitride in order to increase the partial pressures of the decomposition products in the vicinity of the presintered body.

EXAMPLE 5

To two types of $Si_3N_4$ powder, one being commercially available $Si_3N_4$ powder obtained through the nitridation of Si powder (i.e., by the Si-nitridation method) and the other being $Si_3N_4$ powder produced by thermally decomposing a reaction product of silicon tetrachloride and ammonia ($SiCl_4+NH_3$ synthesis method), was added as a sintering aid 6% of $Y_2O_3$ powder. The resultant mixtures were mixed in an organic solvent for ten hours by means of a ball mill and then dried. Each of the resulting powder was cold compacted under a pressure of 1 ton/cm², sintered by the hot pressing sintering method to presintered bodies having a relative density of 92%. They were then subjected to an $N_2$ HIP treatment under the conditions of 1900° C.×800 atm×0.5 hour. Physical properties of resultant HIP sintered bodies are shown in Table 3.

TABLE 3

| Type of Si₃N₄ powder | Relative density (%) | Weight loss (%) | Bend Strength Three-point loading test (room temp. Kg/mm²) |
| --- | --- | --- | --- |
| Si-nitridation method | 98 | 2.5 | 79 |
| SiCl₄ + NH₃ synthesis method | 100 | 0.1 | 103 |

From the above table, it is appreciated that, compared with $Si_3N_4$ powder obtained in accordance with the Si-nitridation method, the $Si_3N_4$ produced by the $SiCl_4$+$NH_3$ synthesis method is densified higher and thus made stronger as well as its weight loss is considerably low. This difference is con sintered to stem from the fact that $Si_3N_4$ powder obtained by the synthesis method contains less impurities and its particle size is very small compared with that resulted from the Si-nitridation method, the opening ratio of its inner pores is thus very small although both pre-sintered bodies had the same relative density, the densifying effect of the HIP treatment is high and the progress of the thermal decomposition can be decelerated to a considerable extent.

EXAMPLE 6

$Y_2O_3$, $Al_2O_3$ and MgO powder were added in various proportions to commercially available $Si_3N_4$ powder. Resulting powder mixtures were press-formed under a pressure of 1000 Kg/cm² to form green compacts, which were subsequently subjected to a pressureless sintering at a temperature of 1550°–1780° C. in an atmosphere of nitrogen gas. Table 4 shows the proportion of each powder, sintering conditions and the relative density and strength of each of the sintered bodies obtained.

far below the practically meaningful strength. On the other hands, in the examples making use of a $Y_2O_3$—$Al_2O_3$—MgO system sintering aid, it is possible to obtain a bend strength of the order of 40 Kg/mm² or higher provided that the sintering conditions are suitably selected. Particularly, in Sample Nos. 6 and 9, high strength sintered bodies of 70 Kg/mm² or higher were obtained.

As apparent from these facts, use of a $Y_2O_3$—$Al_2O_3$—MgO system sintering aid permits the adoption of the pressureless sintering method which has been considered impractical for conventional $Y_2O_3$—$Al_2O_3$ system sintering aids. Accordingly, the raw material powder can be formed into a desired complex shape in accordance with the injection molding, extrusion or slip casting method. This assures that sintered products of various complex shapes can be prepared easily at a low production cost.

$Y_2O_3$, $Al_2O_3$ and MgO are fused together at a sintering temperature and sinter $Si_3N_4$ into a dense mass. However, if $Y_2O_3$ is added in a proportion exceeding 13% by weight, the oxidation resistance property of the sintered body will be lessened sharply. Thus, it is desirous to limit the proportion of $Y_2O_3$ below 13%. On the other hand, if the content of $Y_2O_3$ is too low, the sintering will become rather difficult. Thus, it is desirous to add $Y_2O_3$ in a proportion of at least 3%. $Al_2O_3$ acts to reduce the deterioration of the oxidation resistance property of a sintered product due to the incorporation of $Y_2O_3$, especially, the abrupt lowering of the oxidation resistance property above 1000° C. However, an excessive incorporation of $Al_2O_3$ will lead to a deteriorated strength of a sintered body. Thus, it is desirous to limit the content of $Al_2O_3$ below 4%. On the other hand, if added too little, the above inhibitory action against the deterioration of the oxidation resistance property cannot be expected. Therefore, it is preferable to add at least 0.5% of $Al_2O_3$. Next, MgO is a sintering aid which constitutes one of features of this invention. It is a component which enables the adoption of the pressureless sintering method. An incorporation of less than 0.5% of MgO does not substantially

TABLE 4

| Sample No. | Composition (wt %) | | | | Sintering conditions | | Relative density (%) | Bend strength at room temp. (Kg/mm²) | Note |
| --- | --- | --- | --- | --- | --- | --- | --- | --- | --- |
| | Si₃N₄ | Y₂O₃ | Al₂O₃ | MgO | Temp (°C.) | Time (min) | | | |
| 1 | 92 | 6 | 2 | — | 1600 | 200 | 79 | — | Comparative example |
| 2 | 95.8 | — | 3.0 | 1.2 | 1750 | 180 | 91 | 31.0 | Comparative example |
| 3 | 91 | — | 4.5 | 4.5 | 1780 | 180 | 92 | 38.5 | Comparative example |
| 4 | 91 | 6 | 2 | 1 | 1600 | 200 | 86 | 32 | This invention |
| 5 | 89 | 6 | 2 | 3 | 1600 | 200 | 93 | 57 | This invention |
| 6 | 87 | 6 | 2 | 5 | 1600 | 200 | 95 | 70 | This invention |
| 7 | 91 | 6 | 2 | 1 | 1550 | 200 | 91 | 44 | This invention |
| 8 | 89 | 6 | 2 | 3 | 1550 | 200 | 96 | 62 | This invention |
| 9 | 87 | 6 | 2 | 5 | 1550 | 200 | 96 | 74 | This invention |

Now, a discussion is extended on each result shown in the above table. In Sample No. 1 using a conventional $Y_2O_3$—$Al_2O_3$ system sintering aid, the sintering did not proceed to a sufficient degree because it was conducted under normal pressure. Thus, it was unable to measure its bend strength. In Sample Nos. 2 and 3 containing no $Y_2O_3$, despite of the employment of high sintering temperatures, their bend strengths remained at the level of 30 Kg/mm² and were still exhibit its densifying effect in the pressureless sintering. Accordingly, it is desirous to add MgO in an amount of at least 0.5%, preferably, 1.5% or more. However, if MgO is added too much, there will be a danger of lowering the strength. Thus, it is also desirous to set its upper limit at 6%.

Regarding the presintering temperature when a $Y_2O_3$—$Al_2O_3$—MgO system sintering aid is employed, a discussion will be made in the following example.

EXAMPLE 7

Figure 5:
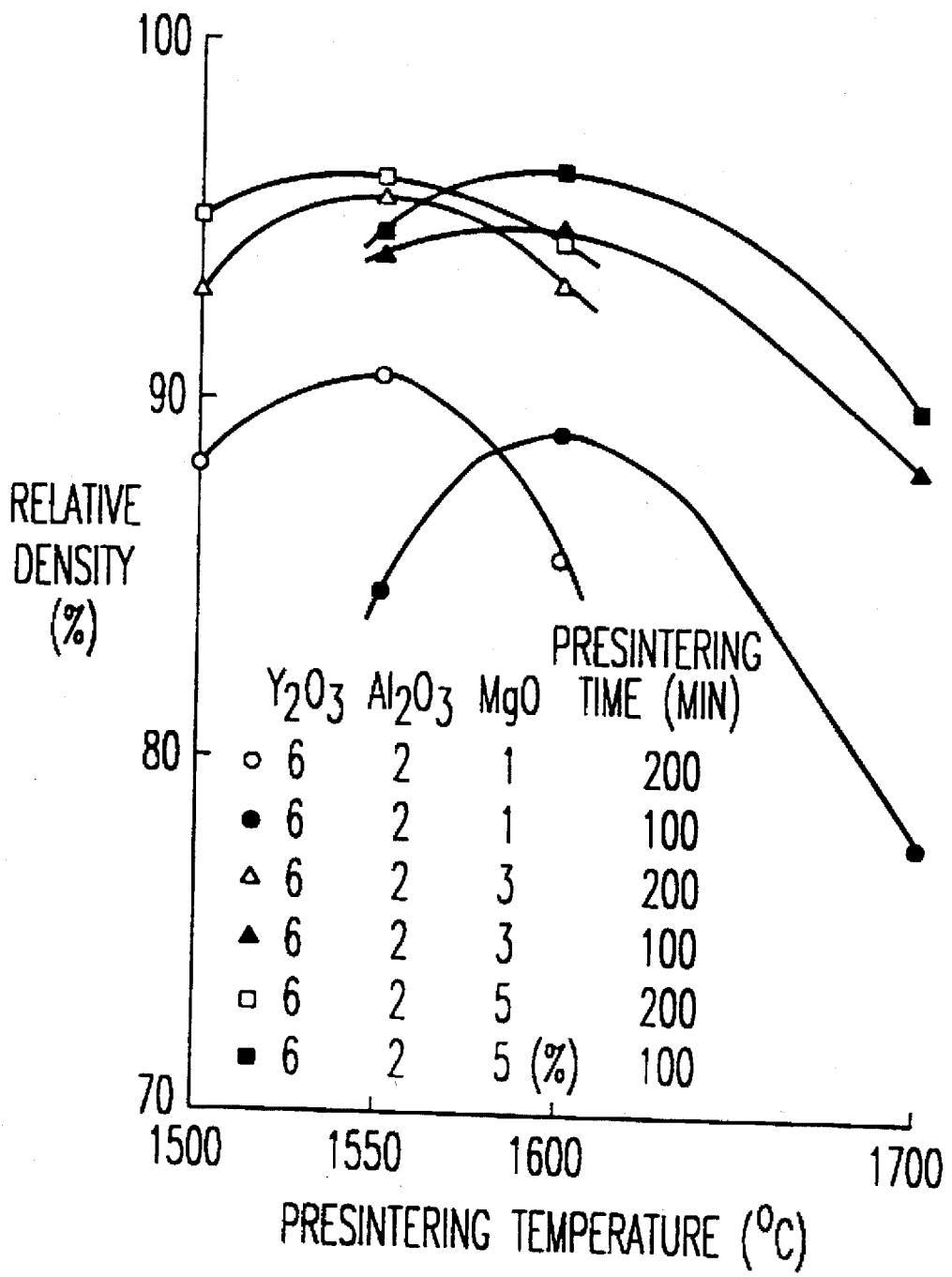
FIG. 5 is a graphical representation of the relative densities of various presintered bodies obtained in accordance with the present invention and their presintering temperatures.

To $Si_3N_4$ powder, were added respectively 6% of $Y_2O_3$, 2% of $Al_2O_3$ and 1%, 3% and 5% of MgO as sintering aids to obtain three different types of powder mixtures. They were pressure-formed under a pressure of 1000 Kg/cm$^2$ and then presintered in an atmosphere of nitrogen gas at temperatures of 155° C., 1600° C. and 1700° C. and for 100 minutes and 200 minutes. Results are shown in FIG. 5.

Namely, when presintered for 200 minutes, the density of each presintered body becomes highest near the presintering temperature of 1550° C., reaching a density above 90% despite of the application of the pressureless sintering method. When presintered for 100 minutes, the highest density was obtained near 1600° C., where the density was approximately 90% or higher. In view of these results, where a $Y_2O_3$—$Al_2O_3$—MgO system sintering aid is employed, it is not necessary to conduct the presintering at a high temperature of 1700° C. or higher which has been generally employed for sintering. It has been found that the presintering can be performed satisfactorily at relatively low temperatures. Accordingly, the presintering temperature to be used in the present invention may preferably be in the range of 1500-1700° C. It should be chosen from the above range in accordance with the proportion of the sintering aid. More preferably, it is desirous to limit the presintering temperature to a range of 1500°-1600° C.

The presintering time is now described in the following example.

EXAMPLE 8

The sintering aids were incorporated in various proportions in $Si_3N_4$ powder. The resulting powder mixtures were formed into green compacts in much the same way as in Example 6. The green compacts were thereafter presintered at normal pressure in an atmosphere of $N_2$ gas at 1600° C. for 25-200 minutes. Results are shown diagrammatically in FIG. 6.

Figure 6:
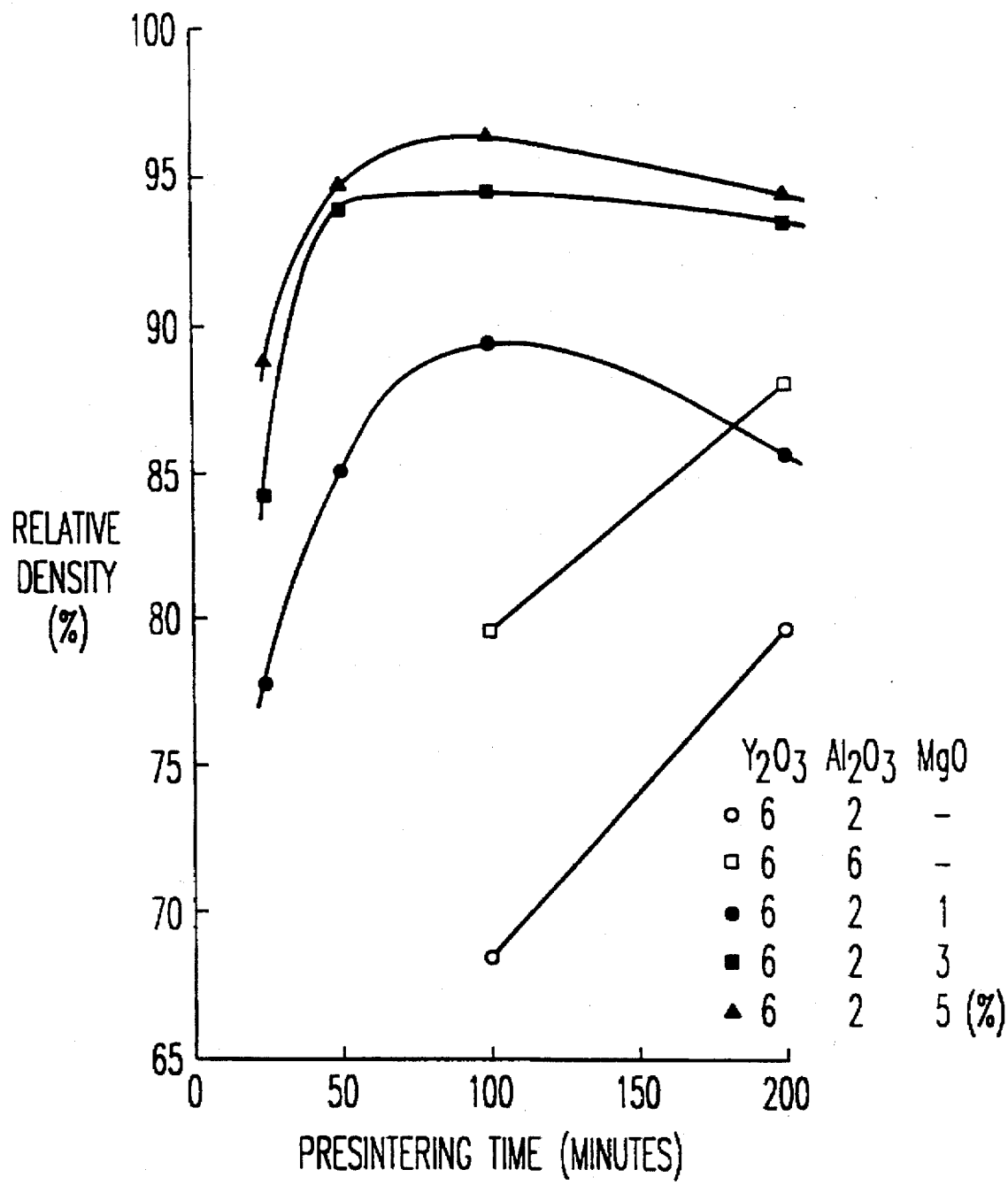
FIG. 6 is a diagrammatic illustration showing the relationship between the presintering time periods of the presintered $Si_3N_4$ bodies and their relative densities.

As appreciated from FIG. 6, where conventional $Y_2O_3$—$Al_2O_3$ system sintering aids were employed, there is a tendency that the relative density becomes higher as the presintering time becomes longer. On the other hand, when $Y_2O_3$—$Al_2O_3$—MgO system sintering aids were incorporated, an opposite trend is observed, in other words, the relative density tends to lower as the presintering time becomes longer. Accordingly, in the present invention, a particularly long sintering time period is unnecessary. To obtain a high density presintered body having a relative density of 92% or higher, a presintering time period of not longer than 200 minutes is necessary. Preferably, it is desirous to conduct the presintering step in 100 minutes. On the other hand, if the presintering time is too short, the sintering does not proceed to a sufficient degree. Thus, the presintering time is preferably at least 30 minutes, more preferably, 50 minutes or longer. Therefore, where a $Y_2O_3$—$Al_2O_3$—MgO system sintering aid is employed, the presintering can be conducted in a shorter period of time compared with the case in which a conventional $Y_2O_3$—$Al_2O_3$ system sintering aid is used. The former sintering aid is thus expected to bring about another effect that the presintering energy can be saved considerably.

In accordance with the above-described method, it is possible to obtain a high density presintered body having a relative density of 92% or higher by the pressureless sintering method. It is also possible to obtain highly strong products having a bend strength of 70 Kg/mm$^2$ or higher. However, to obtain a sintered product having a still higher density and strength, the application of the pressureless sintering method only will encounter a limit and it is thus densified further in accordance with the above-mentioned HIP method. Although it has already been well-known to produce high density sintered $Si_3N_4$ in accordance with the HIP method, such HIP method was generally carried out by hermetically sealing $Si_3N_4$ powder or its green compact in a capsule made of a deformable material. Glass is usually used to make such capsules.

However, since the density of $Si_3N_4$ powder or its green compact to be sealed in a capsule is extremely low, the capsule undergoes a high degree of deformation during the HIP treatment, whereby resulting in the breakage of the capsule and making the HIP treatment fruitless. Even if the capsule barely escapes breakage, a difference in shrinkage tends to occur between a thick portion and thin portion and leads to poor dimensional accuracy. Where the capsule is made of glass, the glass is fused at high temperatures and penetrates into gaps between $Si_3N_4$ power particles, thereby unavoidably lowering the heat-resistant properties of a resultant sintered product. There is also another drawback that cracks may occur in the sintered product due to the difference in thermal expansion coefficient between the sintered $Si_3N_4$ and glass while the sintered $Si_3N_4$ is cooled after the HIP treatment.

On the other hand, in the present invention, the relative density of a green compact is increased to a value of 92% or higher through the above-mentioned pressureless presintering method. Thus, in the resulting presintered body, most of pores are closed. This permits to subject the presintered body directly to an HIP treatment without using a capsule as required in the conventional method. In carrying out the HIP-treatment, Ar gas is generally employed. However, in the present invention, it is necessary to use $N_2$ gas, which is capable of suppressing the decomposition of $Si_3N_4$, as a pressure medium gas since the presintered body is exposed directly in the pressure medium gas without protecting the same in a capsule and $Si_3N_4$ would undergo thermal decomposition at high temperatures, thereby leading to deterioration of the surface layer of the sintered product and lowering of its density.

The HIP method of the present invention will be described further in the following example.

EXAMPLE 9

The presintered bodies of Sample Nos. 4 through 7 in Example 6 were subjected to an HIP treatment for 60 minutes in an atmosphere of $N_2$ gas of 1700°-1900° C. and 1000 atm. A measurement of the density and bend strength at room temperature of each of the resultant sintered products gave results shown in Table 5.

TABLE 5

| No. | Before HIP | | HIP conditions | | | After HIP | |
|---|---|---|---|---|---|---|---|
| | R.D. (%) | B.S. | Temp. | P. | Time | R.D. (%) | B.S. |
| 4 | 86 | 32 | 1900 | 1000 | 60 | 90 | 45 |
| 5 | 93 | 57 | 1700 | 1000 | 60 | 98 | 88 |
| 6 | 95 | 70 | 1700 | 1000 | 60 | 98 | 85 |
| 7 | 91 | 44 | 1700 | 1000 | 60 | 96 | 71 |

Note:
R.D. - Relative Density;
B.S. - Bend Strength (Kg/mm$^2$)
Temp. - Temperature (°C.);
P. - Pressure (atm)
Time (min)

As clearly appreciated from the above table, both density and strength are considerably improved by the HIP treatment. Particularly, in Sample Nos, 5 and 6 whose densities were relatively high before HIP, their densities were raised to as high as 98% by the HIP treatment as well as their strengths gave considerably high values of 88 Kg/mm$^2$ and 85 Kg/mm$^2$ respectively. Thus, distinct effects of the HIP treatment are understood. In Sample Nos. 4 and 7 whose densities were rather low compared with Sample Nos. 5 and 6 before HIP, the effects of the HIP treatment are observed low. This is explained as follow. Namely, the porosity of each presintered body was high and more pores communicated to the surface as open pores, whereby reducing the pore-closing effect of the HIP treatment. According to various research results obtained by the present inventors, the effect of the HIP treatment can be exhibited clearly where the relative density of a presintered body reaches 90%. It has been found, particularly, that high density sintered products of a relative density of 98% or higher can be obtained substantially always if the relative density of a presintered body is 92% or higher.

Accordingly, to enhance the effect of the HIP treatment, it is preferable to prepare in advance a presintered body having a relative density of 92% or higher in accordance with the pressureless sintering method.

As described above in detail, a presintered body of a high density can be easily obtained in accordance with the pressureless sintering method by using a $Y_2O_3$—$Al_2O_3$—MgO system sintering aid. Since $Si_3N_4$ is formed into a desired shape beforehand in a powder state, a complex shape can be easily formed. In addition, the presintering temperature can be relatively lowered and the presintering time can be shortened, thereby enabling to lower the sintering cost and energy considerably.

When densifying and strengthening further the presintered body produced by the above-described pressureless sintering method in accordance with the-HIP method, the HIP treatment can be easily performed without using any capsule and the effects of the HIP treatment can be enhanced further since the presintered body obtained in the above method has already been densified to a considerable degree.

EXAMPLE 10

As a raw material powder, was used commercially available $Si_3N_4$ powder produced by nitridation of Si (content of α—$Si_3N_4$: 90%; content of β—$Si_3N_4$: 10%; mean particle size: 1 μm), to which were added as sintering aids 6% by weight of $Y_2O_3$, 3% by weight of MgO and 2% by weight of $Al_2O_3$. The resulting mixture was cold compacted under a pressure of 1 ton/cm$^2$ and presintered under the atmospheric pressure, in $N_2$ gas and for 200 minutes, by changing the sintering temperatures. Presintered bodies having properties shown in Sample Nos. 1 through 7 in Table 6 were resulted. Then, these presintered bodies were subjected to an HIP treatment under the HIP conditions indicated in Sample Nos. 1 through 7 in Table 7 without applying a pore-closing treatment to them. A measurement of the properties of each of the resultant sintered products gave the results summarized in Sample Nos. 1 to 7 in Table 7. In Tables 6 and 7, Sample Nos. 1–4, 6 and 7 relate to the present invention while Sample No. 5 is a comparative example.

TABLE 6

| | | | Properties of presintered body | | |
|---|---|---|---|---|---|
| Sample No. | $Si_3N_4$ Powder | Sintering aid and amount added (wt. %) | Relative density (%) | Content of β-$Si_3N_4$ (%) | Bend strength at room temperature (Kg/mm$^2$) |
| 1 | Si-nitridation method | $Y_2O_3$(6), MgO(3), $Al_2O_3$(2) | 94 | 25 | 56 |
| 2 | Si-nitridation method | $Y_2O_3$(6), MgO(3), $Al_2O_3$(2) | 96 | 58 | 47 |
| 3 | Si-nitridation method | $Y_2O_3$(6), MgO(3), $Al_2O_3$(2) | 96 | 58 | 47 |
| 4 | Si-nitridation method | $Y_2O_3$(6), MgO(3), $Al_2O_3$(2) | 95 | 76 | 51 |
| 5* | Si-nitridation method | $Y_2O_3$(6), MgO(3), $Al_2O_3$(2) | 94 | 85 | 61 |
| 6 | Si-nitridation method | $Y_2O_3$(6), MgO(3), $Al_2O_3$(2) | 96 | 48 | 62 |
| 7 | Si-nitridation method | $Y_2O_3$(6), MgO(3), $Al_2O_3$(2) | 97 | 57 | 50 |
| 8* | Si-nitridation method | $Y_2O_3$(6), MgO(5), $Al_2O_3$(2) | 98 | 81 | 70 |
| 9 | Si-nitridation method | $Y_2O_3$(6), MgO(1), $Al_2O_3$(2) | 96 | 61 | 45 |
| 10 | Si-nitridation method | $Y_2O_3$(8), $Al_2O_3$(2) | 93 | 56 | 69 |
| 11* | Si-nitridation method | $Y_2O_3$(8), $Al_2O_3$(2) | 95 | 90 | 75 |
| 12* | Si-nitridation method | MgO(5), $Al_2O_3$(3), $Fe_2O_3$(1) | 97 | 100 | 58 |
| 13 | Gas phase method | $Y_2O_3$(6), MgO(3), $Al_2O_3$(2) | 93 | 35 | 58 |
| 14* | Gas Phase method | $Y_2O_3$(6), MgO(3), $Al_2O_3$(2) | 94 | 83 | 73 |
| 15 | Si-nitridation method | $Y_2O_3$(6), $Al_2O_3$(2) | 83 | 66 | 35 |
| 16* | Si-nitridation method | $Y_2O_3$(6), $Al_2O_3$(2) | 81 | 95 | 46 |

*Comparative example

TABLE 7

| Sample No. | Pore-closing treatment | HIP treatment conditions | | | | Properties of sintered body | | |
|---|---|---|---|---|---|---|---|---|
| | | Temp. (°C.) | Pressure (atm) | Time (min) | Pressure gas | Relative density (%) | Content of β-$Si_3N_4$ (%) | Bend strength at room temp. (Kg/mm$^2$) |
| 1 | Skipped | 1700 | 1000 | 60 | $N_2$ | 98 | 95 | 81 |
| 2 | Skipped | 1700 | 500 | 60 | $N_2$ | 99 | 75 | 82 |
| 3 | Skipped | 1700 | 1000 | 60 | Ar | 95 | 99 | 63 |
| 4 | Skipped | 1700 | 1700 | 60 | $N_2$ | 100 | 79 | 87 |
| 5* | Skipped | 1700 | 1000 | 60 | $N_2$ | 99 | 100 | 48 |
| 6 | Skipped | 1850 | 1000 | 60 | $N_2$ | 100 | 100 | 95 |
| 7 | Skipped | 1850 | 1700 | 60 | $N_2$ | 100 | 100 | 73 |
| 8* | Skipped | 1700 | 1000 | 60 | $N_2$ | 99 | 82 | 73 |
| 9 | Skipped | 1700 | 1000 | 60 | Ar | 95 | 100 | 88 |
| 10 | Skipped | 1700 | 1000 | 60 | $N_2$ | 98 | 100 | 98 |
| 11* | Skipped | 1700 | 1000 | 60 | $N_2$ | 99 | 100 | 60 |
| 12* | Skipped | 1850 | 1000 | 60 | $N_2$ | 99 | 100 | 58 |
| 13 | Skipped | 1700 | 1000 | 30 | $N_2$ | 99 | 98 | 108 |
| 14* | Skipped | 1700 | 1000 | 30 | $N_2$ | 96 | 98 | 62 |
| 15 | Applied | 1800 | 700 | 60 | $N_2$ | 95 | 100 | 85 |
| 16* | Applied | 1800 | 700 | 60 | $N_2$ | 93 | 100 | 49 |

*Comparative example

As readily appreciated from the results given in the above tables, except for Sample No. 5 which is a comparative example, the content of β—$Si_3N_4$ in the presintered body of each of Sample Nos. 1–4, 6 and 7 which were prepared in accordance with the present invention ranges 25–76%. In each of Sample Nos. 1–4, 6 and 7, the relative density was improved by the NIP treatment and the bend strength was considerably improved.

On the other hand, in Sample No. 5 in which the content of β—$Si_3N_4$ in the presintered body exceeds 80%, the bend strength was rather lowered by the HIP treatment although its relative density was increased by the same HIP treatment.

In order to investigate influence of the type of pressure medium gas in the HIP treatment, Sample No. 1 in which $N_2$ gas was used as a pressure medium gas-was compared with Sample No. 3 in which Ar gas was employed as a pressure medium gas. The relative density was not improved by the HIP treatment where Ar gas was used, although the bend strength was apparently improved. When $N_2$ gas was employed, both relative density and bend strength were improved by the HIP treatment. Thus, it is easily appreciated that $N_2$ gas is a preferred pressure medium gas.

EXAMPLE 11

Similar to Example 10, $Si_3N_4$ powder was employed. By varying the type and amount of sintering aids as indicated in Sample Nos. 8–12 in Table 6, Sample Nos. 8, 9 and 12 were compacted and presintered in much the same way as in Example 10. Sample Nos. 10 and 11 were presintered through hot pressing respectively at 1600° C. and 1700° C., at 250 Kg/cm$^2$ and for 30 minutes, resulting in the production of presintered bodies having properties as shown in Sample Nos. 8–12 in Table 6. These presintered bodies were, similar to Example 10, subjected to an HIP treatment under the HIP conditions given in Sample Nos. 8/12 in Table 6.—Thereafter, the properties of the resultant sintered products were measured, providing results as shown in Sample Nos. 8–12 in Table 7. In Tables 6 and 7, sample Nos. 8, 11 and 12 represent comparative examples.

It is understood, from the results summarized in the above tables, that, although Sample Nos. 9 and 10 used sintering aids different from those employed in Example 10, the HIP treatment could improve their relative densities and bend strengths similar to Example 10.

On the other hand, in Sample Nos. 8, 11 and 12 in which the contents of β—$Si_3N_4$ in the presintered bodies were high, namely, 81%, 90% and 100% respectively, their relative densities were increased by the HIP treatment whereas improvement in bend strength was hardly observed. Thus, it is appreciated that, even if the content of β—$Si_3N_4$ in a presintered body is raised to 100%, the bend strength of a sintered product to be obtained through an HIP treatment would not be improved.

EXAMPLE 12

As a raw material $Si_3N_4$ powder, was employed $Si_3N_4$ powder prepared in accordance with the gas phase method (amorphous portions: 40%; α—$Si_3N_4$: 57%; β—$Si_3N_4$: 3%; mean particle size: 1 μm), to which the same sintering aids as in Example 10 were added and mixed. The resultant powder mixture was compacted and presintered similar to Example 10, resulting in the production of presintered bodies having properties given in Sample Nos. 13 and 14 in Table 6. Then, these presintered bodies were subjected to an HIP treatment under the HIP conditions shown in Sample Nos. 13 and 14 in Table 7, similar to Example 10. A measurement of the properties of each of the resulting sintered products gave results shown in Sample Nos. 13 and 14 in Table 7. In Tables 6 and 7, Sample No. 14 represents a comparative example. From the results in these tables, it is easily appreciated that sample No. 13, in which the content of β—$Si_3N_4$ in the presintered body was 35% was considerably improved in bend strength through its HIP treatment compared with Sample No. 14, in which the content of β—$Si_3N_4$ accounted for 83%, and the method of this invention thus has a great effect in improving the bend strength of a sintered product even if $Si_3N_4$ powder made by the gas phase method is employed.

It is also appreciated from the above tables that the bend strength can be improved by the HIP treatment more effectively when $Si_3N_4$ powder obtained by the gas phase method is employed as a starting material than when $Si_3N_4$ powder produced by the nitridation method is used as a starting material.

EXAMPLE 13

The same $Si_3N_4$ as that used in Example 10 was used. It was then added with the sintering aids shown in Sample Nos. 15 and 16 in Table 6 and mixed therewith. Similar to Example 10, the thus-obtained powder mixtures were compacted and presintered into presintered bodies, whose properties are given in Sample Nos. 15 and 16 in Table 6. These presintered bodies were immersed in an organic solvent slurry containing a powder mixture which consists of 80% by weight of $Si_3N_4$, 10% by weight of $SiO_2$ and 10% by weight of $Al_2O_3$, thereby applying the slurry on the surfaces of the bodies, drying and firing the same. Now, their pore-closing treatments were completed. Then, similar to Example 10, they were subjected to an HIP treatment under the treatment conditions given in Sample Nos. 15 and 16 in Table 7. A measurement of the properties of each of the resultant sintered product gave results as shown in Sample Nos. 15 and 16 in Table 7. In Tables 6 and 7, Sample No. 16 is a comparative example.

shown in Table 8. They were then subjected to an HIP treatment under the HIP conditions, also given in Table 8. Resultant sintered products were withdrawn out of the HIP furnace at temperatures indicated in Table 8, followed by the application of a heat treatment given in the same table, resulting in the preparation of sintered $Si_3N_4$ products.

A measurement of density and bend strength on each of these $Si_3N_4$ products gave results shown in Table 8.

TABLE 8

| Sample No. | Sintering aid $Y_2O_3$—$Al_2O_3$—MgO (%) | Presintering conditions Temp (°C.) | Presintering conditions Time (min) | Charging Temp. into HIP (°C.) | HIP treatment conditions P (atm) | HIP treatment conditions Temp. (°C.) | HIP treatment conditions Time (min) | Discharging temp. from HIP furnace (°C.) | Charging temp. into heat treatment furnace (°C.) | Heat treatment conditions Temp (°C.) | Heat treatment conditions Time (min) | Properties of sintered body Relative density (%) | Properties of sintered body Bend strength (Kg/mm²) | Note |
|---|---|---|---|---|---|---|---|---|---|---|---|---|---|---|
| 1 | 6, 2, 3, | 1600 | 100 | 1000 | 1000 | 1700 | 30 | 1100 | 1000 | — | | 99 | 43 | Comparative example |
| 2 | 6, 2, 3, | 1600 | 100 | 1000 | 1000 | 1700 | 30 | 1100 | 1000 | 1000 | 5 | 99 | 78 | |
| 3 | 6, 2, 3, | 1600 | 100 | 300 | 1000 | 1700 | 30 | 1100 | 1000 | 1000 | 5 | 99 | 46 | Comparative example |
| 4 | 6, 2, 3, | 1600 | 100 | 700 | 1000 | 1700 | 30 | 800 | 700 | 700 | 5 | 99 | 83 | |
| 5 | 6, 2, 3, | 1600 | 100 | 700 | 1000 | 1700 | 30 | 500 | 400 | 400 | 5 | 99 | 37 | Comparative example |
| 6 | 6, 2, 3, | 1600 | 100 | 1000 | 700 | 1700 | 30 | 1100 | 1000 | 1000 | 5 | 99 | 84 | |
| 7 | 6, 2, 3, | 1600 | 100 | 1000 | 1000 | 1700 | 30 | 1100 | 1000 | 1400 | 300 | 99 | 109 | |
| 8 | 6, 2, 3, | 1600 | 100 | — | — | — | — | — | — | — | | 92 | 50 | Comparative example |
| 9 | 6, 2, 5, | 1550 | 200 | 1000 | 1000 | 1800 | 10 | 1100 | 1000 | 800 | 5 | 99 | 89 | |
| 10 | 6, 2, 5, | 1550 | 200 | — | — | — | — | — | — | — | | 95 | 64 | Comparative example |
| 11 | 6, 2, 1, | 1550 | 200 | 1000 | 1000 | 1800 | 10 | 1100 | 1000 | 800 | 5 | 98 | 75 | |
| 12 | 6, 2, 1, | 1550 | 200 | — | — | — | — | 1100 | 1000 | — | | 85 | 41 | Comparative example |

From the above tables, it is understood that a greater improvement by the HIP treatment to the bend strength was achieved in Sample No. 15 containing β—$Si_3N_4$ in a proportion of 66% compared with Sample No. 16 which contained β—$Si_3N_4$ as much as 95%, and the method of this invention can exhibit a great effect in improving the bend strength of a sintered product even if the HIP treatment is conducted on a presintered body which has been subjected in advance to a pore-closing treatment.

Putting all the results obtained in the above Examples 10 to 13 together, it is clear that, according to this invention, both relative density and bend strength can be improved to a considerable extent and sintered $Si_3N_4$ products of a high density and strength can be prepared.

EXAMPLE 14

In commercially available $Si_3N_4$ powder produced by nitridation of Si powder, were incorporated in varied proportions $Y_2O_3$ powder, $Al_2O_3$ powder and MgO powder as sintering aids. The thus-prepared powder mixtures were compacted under a pressure of 500 Kg/cm² and, then, resulting green compacts were respectively presintered in an atmosphere of $N_2$ gas under the presintering conditions given in Table 8, followed by charging the thus-obtained presintered bodies into an HIP furnace at temperatures As apparent from Table 8, in Comparative Example No. 1 wherein no heat treatment was effected subsequent to the HIP treatment and Comparative Example No. 5 wherein the heat treatment temperature was low, namely, 400° C., the cooling velocity of each of the sintered bodies after the HIP treatment was fast. Thus, their bend strengths were low although they were highly densified. On the other hand, Sample Nos. 2, 4 and 6 were each a sintered product having a high density as well as high bend strength. It has thus recognized that the heat treatment is very effective. This effect appears to have been derived from the fact that fine cracks occurred in Comparative Example Nos. 1 and 5 due to the thermal shocks caused by the sudden cooling after the HIP treatment whereas, in Sample Nos. 2, 4 and 6, the sintered bodies were not rapidly cooled down owing to the incorporation of the heat treatment and occurrence of cracks was thus avoided. In addition Sample No. 7, which was subjected to a longer heat treatment, i.e., a heat treatment for 5 hours had an outstandingly high bend strength compared with the rest of the samples because the glassy phases at boundaries of $Si_3N_4$ had been crystallized in the course of the heat treatment.

On the other hand, Comparative Example No. 3 which was charged at a low temperature, i.e., 300° C. into the HIP furnace had a low bend strength and was much inferior in bend strength to other samples. In Comparative Example No. 3, the bend strength of the final sintered product is considered to have been weakened, probably, as a result that structural defects such as cracks occurred by thermal shocks due to the rapid heating upon the HIP treatment.

Similar tendency was also observed on Sample Nos. 9, 10, 11 and 12 in which the amounts of the sintering aids were changed. Sample Nos. 9 and 10 were improved in both density and bend strength compared with presintered bodies, to which no HIP treatment was applied and, as envisaged, had good density and bend strength.

By the way, it is clear that in each of the above-described methods retention of temperature in each of the steps above a required temperature conforms with the view point of energy saving and contributes considerably to the saving of energy.

In view of the above results, it can be concluded that the method of this invention is extremely effective from industrial standpoint as a production method of high density sintered silicon nitride ($Si_3N_4$). Its industrial application is expected in the near future, particularly, as a method for producing high density sintered $Si_3N_4$ of complex configurations since the HIP treatment is effected without using capsules.

Although the invention has been described with reference to preferred embodiments, other embodiments may be resorted to without departing from the spirit and scope of the invention as defined by the appended claims.

What is claimed is:

1. A method for producing high density sintered silicon nitride ($Si_3N_4$) having a relative density of at least 98%, said method comprising:

forming silicon nitride powder into a desired shape to obtain a silicon nitride green compact;

presintering said green compact under a nitrogen gas atmosphere ranging in pressure from 1 to 30 atmospheres at a temperature of 1500°–1600° C. for 50–200 minutes into a presintered $Si_3N_4$ body whose $\alpha$—$Si_3N_4$ content ranges from 80–20% and whose $\beta$—$Si_3N_4$ content ranges from 20–80% and which has a relative density of at least 92%;

removing the presintered body at room temperature from the presintering furnace;

charging the cooled presintered body into a hot isostatic pressing furnace;

subjecting said presintered $Si_3N_4$ body to hot isostatic pressing without being confined by a capsule in an inert gas atmosphere of a temperature in the range of 1500°–2100° C. and of a nitrogen gas partial pressure of at least 500 atm until a $Si_3N_4$ body is obtained of at least 80% $\beta$—$Si_3N_4$ having a relative density of at least 98%; and discharging the sintered body at room temperature from the hot isostatic pressing force.

2. A method for producing high density sintered silicon nitride ($Si_3N_4$) having a relative density of at least 98%, said method comprising:

forming silicon nitride powder into a desired shape to obtain a silicon nitride green compact;

presintering said green compact under a nitrogen gas atmosphere ranging in pressure from 1 to 30 atmospheres at a temperature of 1500°–1600° C. for 50–200 minutes into a presintered $Si_3N_4$ body whose $\alpha$—$Si_3N_4$ content ranges from 80–20% and whose $\beta$—$Si_3N_4$ content ranges from 20–80% and which has relative density of at least 92%;

removing the presintered body at room temperature from the presintering furnace;

charging the cooled presintered body into a hot isostatic pressing furnace;

subjecting said presintered $Si_3N_4$ body to hot isostatic pressing without being confined by a capsule in an inert gas atmosphere of a temperature in the range of 1500°–2100° C. and of a nitrogen gas partial pressure of at least 500 atm until a $Si_3N_4$ body is obtained of at least 80% $\beta$—$Si_3N_4$ having a relative density of at least 98%;

discharging the sintered body at room temperature from the hot isostatic pressing furnace; and then heat-treating said sintered body at a temperature of 500° C. or higher in a heat treatment furnace.

3. A method for producing high density sintered silicon nitride ($Si_3N_4$) having a relative density of at least 98%, said method comprising:

forming silicon nitride powder into a desired shape to obtain a silicon nitride green compact;

presintering said green compact under a nitrogen gas atmosphere ranging in pressure from 1 to 30 atmospheres at a temperature of 1500°–1600° C. for 50–200 minutes into a presintered body in a hot isostatic pressing furnace, said presintered $Si_3N_4$ body having a $\alpha$—$Si_3N_4$ content ranging from 80–20% and a $\beta$—$Si_3N_4$ content ranging from 20–80% and which has a relative density of at least 92%;

subjecting said presintered $Si_3N_4$ body continuously to hot isostatic pressing without being confined by a capsule in an inert gas atmosphere of a temperature in the range of 1500°–2100° C. and of a nitrogen gas partial pressure of at least 500 atm until a $Si_3N_4$ body is obtained of at least 80% $\beta$—$Si_3N_4$ having a relative density of at least 98%; and discharging the sintered body at room temperature from the hot isostatic pressing furnace.

4. A method for producing high density sintered silicon nitride ($Si_3N_4$) having a relative density of at least 98%, said method comprising:

forming silicon nitride powder into a desired shape to obtain a silicon nitride green compact;

presintering said green compact under a nitrogen gas atmosphere ranging in pressure from 1 to 30 atmospheres at a temperature of 1500°–1600° C. for 50–200 minutes into a presintered $Si_3N_4$ body in a hot isostatic pressing furnace, said $Si_3N_4$ body having a $\alpha$—$Si_3N_4$ content ranging from 80–20% and a $\beta$—$Si_3N_4$ content ranging from 20–80% and having a relative density of at least 92%;

subjecting said presintered $Si_3N_4$ body continuously to hot isostatic pressing without being confined by a capsule in an inert gas atmosphere of a temperature in the range of 1500°–2100° C. and of a nitrogen gas partial pressure of at least 500 atm until a $Si_3N_4$ body is obtained of at least 80% $\beta$—$Si_3N_4$ having a relative density of at least 98%;

discharging the sintered body at room temperature from the hot isostatic pressing furnace; and then heat-treating said sintered body at a temperature of 500° C. or higher into a heat treatment furnace.

5. The method as claimed in claim 1, 2, 3 or 4, wherein said silicon nitride powder contains at least 80% by weight of $\alpha$—$Si_3N_4$.

6. The method as claimed in claim 1, 2, 3 or 4, wherein said silicon nitride powder further contains a sintering aid.

7. The method as claimed 6, wherein said sintering aid is one or more compounds selected from the group consisting of $Y_2O_3$, $Al_2O_3$, MgO, $ZrO_2$, $TiO_2$, BeO, $La_2O_3$, $CeO_2$, TiN, and AlN and is contained in a total amount of not more than 30% by weight.

8. The method as claimed in claim 7, wherein said sintering aid is a $Y_2O_3$—$Al_2O_3$—MgO system powder mixture.

9. The method as claimed in claim 8, wherein aid silicon nitride powder contains 3–13% of $Y_2O_3$, 0.5–4% of $Al_2O_3$ and 0.5–6% of MgO, all by weight.

10. The method as claimed in claim 1, 2, 3 or 4, wherein the content of $\beta$—$Si_3N_4$ in the sintered silicon nitride ($Si_3N_4$) is increased to 90% or higher through the hot isostatic pressing.

11. The method as claimed in claim 1, 2, 3 or 4, wherein said presintered body is buried in a power consisting principally of at least one nitride ceramic selected from the group consisting of silicon nitride, aluminum nitride and boron nitride and is then subjected to the hot isostatic pressing.

12. The method as claimed in claim 1, 2, 3 or 4, wherein the hot isostatic pressing is carried out at a temperature of 1700°–2000° C.

13. The method as claimed in claim 1, 2, 3 or 4, wherein the isostatic pressing is carried out for a period of from 1 minute to 3 hours.

14. The method as claimed in claim 1, 2, 3 or 4, wherein the nitrogen partial pressure during the hot isostatic pressing is maintained at 700 atm or higher.

15. The method as claimed in claim 1, 2, 3 or 4, wherein the nitrogen partial pressure during the hot isostatic pressing is maintained at 2500 atm or lower.

16. The method as claimed in claimed 1, 2, 3 or 4, wherein the hot isostatic pressing is carried out at a temperature higher than the presintering temperature.

17. The method as claimed in claim 2 or 4, wherein grain boundaries of the sintered silicon nitride ($Si_3N_4$) are crystyallized in the final heat treatment step.

18. The method as claimed in claim 1, 2, 3 or 4, wherein grain boundaries of the sintered silicon nitride ($Si_3N_4$) are crystallized in the hot isostatic pressing step.

19. The method as claimed in claim 1, 2, 3 or 4, wherein said silicon nitride powder has been obtained in accordance with the gas phase reaction method or thermal decomposition method.

20. The method as claimed in claim 1, 2, 3 or 4, wherein the hot isostatic pressing is carried out at a temperature lower by at least 100° C. than the decomposition temperature of $Si_3N_4$ at the pressure employed in the hot isostatic pressing step.

* * * * *